Oct. 29, 1935.    C. E. SWENSON    2,018,768
UNIVERSAL JOINT
Filed July 25, 1932

Inventor
Carl E. Swenson
By
Wilson, Dowell, McCanna & Rehm
Attys.

Patented Oct. 29, 1935

2,018,768

UNITED STATES PATENT OFFICE

2,018,768

UNIVERSAL JOINT

Carl E. Swenson, Rockford, Ill., assignor, by mesne assignments, to Borg-Warner Corporation, Chicago, Ill., a corporation of Illinois Application July 25, 1932, Serial No. 624,601

7 Claims. (Cl. 64—102)

This invention relates to an improved trunnion type universal joint suitable for use on motor vehicles.

The principal object of my invention is to provide a simple, practical and economical construction for a universal joint having roller bearings, and still more particularly a construction which makes a unit of each bearing, whereby to facilitate assembly and make for handiness as well as economy in replacement or repair.

In carrying out this major object, I provide rollers with plain flat ends for abutment at one end with a flat annular surface in the bearing and abutment at the other end with a flat annular portion on a stamped sheet metal retainer ring pressed into place in the lower end of the bearing, the first mentioned surface being the bottom of an annular groove in the bearing, so that the rollers are held against lateral movement bodily out of place by abutment with the side of the groove, and against tilting or cocking out of place at one end by reason of the fact that the rollers have insufficient end clearance to permit of it.

Another important object of the invention consists in the provision of a packing ring for sealing the open end of the bearing against loss of lubricant and entry of dirt and water, and a simple and effective means for maintaining the ring under pressure so as to insure a better seal and incidentally aid in holding the ring against turning with the trunnion, whereby to maintain wiping contact between the ring and trunnion, which is found to make for the most reliable seal.

The invention is illustrated in the accompanying drawing, in which—

Figure 1:
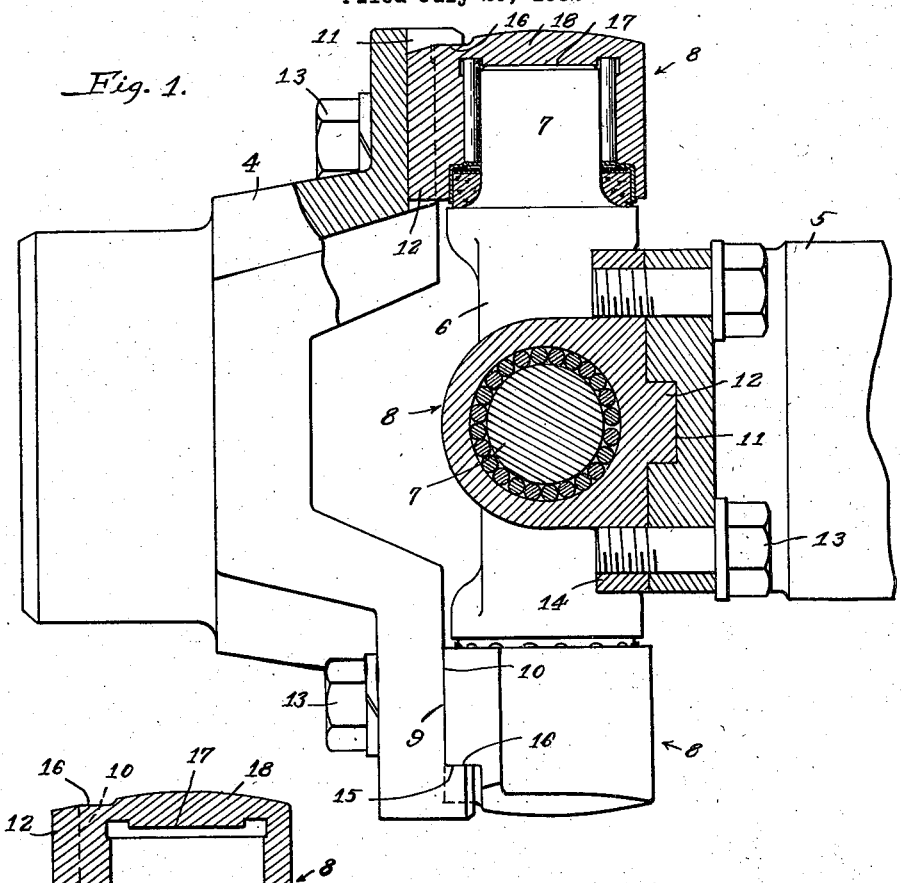
Figure 1 is a side view of a universal joint embodying my invention showing one of the bearings in central longitudinal section and another bearing in section in a transverse plane.

The invention is illustrated in connection with a universal joint constructed somewhat along the lines disclosed in my copending application, Serial No. 615,496, filed June 6, 1932. A pair of yokes or terminal coupling members are shown at 4 and 5 connected by means of an intermediate transmission member 6, often referred to as the spider, the same providing four trunnions 7, ninety degrees apart. The trunnions are received in bearing blocks 8, each yoke being equipped with one pair of these bearings in diametrically opposed relation. The spider 6 is usually made hollow to serve as a central lubricant reservoir from which lubricant is conducted to the various bearings through radial holes provided in the trunnions 7. As described in the aforesaid application, the yokes are machine finished for true dynamic balance and have smooth seats 9 for abutment by flat faces 10 provided on the backs of the blocks 8. The yokes are milled to provide radial slots 11 for reception of radial lugs 12 on the blocks, and are bored on opposite sides of the slots 11 to receive bolts 13 which thread in holes in the lugs 14 formed on the bearing blocks, whereby to clamp the latter to the yokes. The interfitting lugs and slots assume the load so far as the transmission of torque is concerned. Shoulders 15 are provided on the yokes for engagement with surfaces 16 on the bearing blocks 8 to assume the load incident to end thrust, the trunnions 7 being disposed with the ends thereof arranged to bear against end thrust surfaces 17 provided on the inside of the end walls 18 of the bearing blocks 8. The bolts 13 are, therefore, relieved of load due to end thrust and torque, and serve primarily to clamp the bearing blocks to the yoke members.

Figure 2:
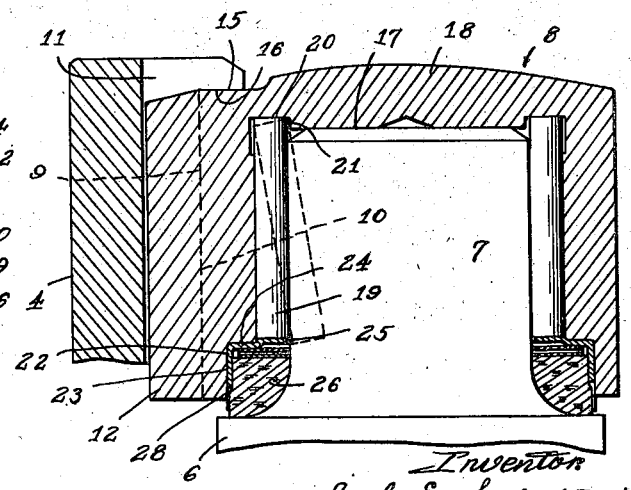
Fig. 2 is an enlargement of the first mentioned bearing.

According to the present invention, the bearings 8, instead of being plain journal bearings, have anti-friction rollers 19 provided therein to make for easier and smoother operation, and consequently, more efficient power transmission and longer life. Under high pressures, such as are dealt with in universal joints in heavy duty service, as on trucks, busses, etc., if a poor lubricant is used, or there is insufficient lubricant, the bearing surfaces in ordinary universal joints having plain journal bearings will break down under the heat of friction that is developed, such joints being apt to heat up to the point of smoking and actually binding. Now, a universal joint having roller type bearings avoids the aforesaid objection, because a roller joint does not heat up under the conditions mentioned but stays cool, which is a factor in preserving the lubricant and avoiding the destruction of the bearing surfaces. The present universal joint is, in other words, intended for heavy duty service, although the same construction could be utilized in smaller joints on higher priced cars whose specifications demand universal joints better than the average. The anti-friction roller bearings can be incorporated without seriously complicating the design and construction, as herein shown. The rollers 19 are flat and smooth on both ends. At one end they engage a flat annular surface 20 forming the bottom of an annular groove 21 provided in the end wall 18 of the bearing block 8. A stamped sheet metal retainer ring 22 pressed into a counterbore 23 in the block 8 is of angular cross-section so as to provide an annular inturned flange 24, the inner marginal portion 25 of which is bent upwardly into abutment with the lower ends of the rollers. In that way the rollers are permanently retained in the bearing block; they cannot move out of place sidewise because the upper ends come into abutment with the side of the groove 21, and they cannot become tilted or cocked for removal, as indicated in dotted lines in Fig. 2, because the marginal portion 25 of the flange 24 confines the ends of the rollers too closely for that. The retainer ring 22 will be provided of brass, or some other material which lends itself as readily to bending. Then, in assembling, it is a simple matter to insert the rollers 19, press the ring 22 into place in the form appearing in Fig. 3, and thereafter bend the marginal portion 25 of the flange 24 of said ring inwardly against the ends of the rollers far enough to be sure to confine the rollers sufficiently to keep them in place, but not enough to interfere with the freedom of the rollers to roll on the inside wall of the bearing block. With this construction it is obvious that each bearing with its complement of rollers and its retainer ring pressed in place therein, constitutes a complete unit, thus facilitating assembling of the bearing in a universal joint, and making it an easy matter to remove and replace bearings in case of inspection, repair or replacement.

Figure 3:
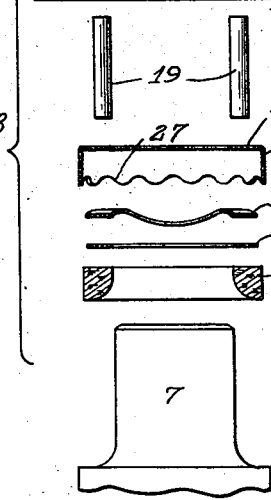
Fig. 3 is a view of the bearing parts appearing in Fig. 2 showing the same in disassembled spaced relation to more clearly illustrate the construction.

In accordance with another important phase of my invention, I provide a packing ring 26 of any suitable compressible, resilient, packing material, such as cork. This ring is intended to seal the open lower end of the bearing block and have wiping contact with the trunnion so as to prevent loss of lubricant and entry of dirt and water. I have found that there are two things which interfere with having a good seal. One is that the packing ring is apt to turn with the trunnion instead of maintaining a wiping contact on it. The other is that the packing ring, while it may exert sufficient pressure against the trunnion at the outset, invariably loses the pressure after the joint has been in service for some time, with the result that leakage occurs. According to my invention, therefore, I have so constructed the packing means to first of all prevent its turning with the trunnion, whereby to maintain wiping contact, and, secondly, I have provided in connection with the packing means a compression spring to maintain the packing means under light but substantially constant pressure so as to maintain a perfect seal against leakage. Referring to Fig. 3, it will be seen that the lower edge of the peripheral flange of the ring 22 is scalloped, as at 27, whereby to provide a series of spaced openings into or through which the material of the packing ring 26, compressed within the confines of the ring 22, is arranged to bulge, as clearly indicated at 28 in Fig. 2, thus interlocking the packing ring 26 with the retainer ring 22 to prevent turning with respect thereto. The packing ring will, therefore, always have wiping contact with the trunnion instead of turning with it. This is one important step toward providing a perfect seal against loss of lubricant and entry of dirt and water. Again referring to Fig. 3, it will be observed that between the flange 24 of the retainer ring 22 and the packing ring 26, I provide a washer 29 seating on the packing ring 26 and a spring washer 30 bearing on the washer 29 on the one hand and against the flange 24 on the other. The spring washer 30 is bent to wavy form, and in the assembling of the bearing is compressed to nearly flat form and, consequently, exerts pressure on the packing ring 26 tending to make it hug the trunnion more tightly for a better seal. This pressure is fairly constant throughout the useful life of the packing ring so that the bearings stay sealed against loss of lubricant and entry of dirt and water over a long period of active service. The pressure imposed on the packing ring by the spring, in addition to insuring good wiping contact on the trunnion, naturally tends to crowd the ring toward the scalloped edge 27 of the ring 22 and thereby better insures the interlocking of the packing ring with the ring 22 to prevent turning.

It is believed the foregoing description conveys a good understanding of the objects and advantages of my invention. The following claims have been drawn so as to cover all legitimate modifications and adaptations.

I claim:

1. In a universal joint including trunnions, a cup-shaped bearing on each of said trunnions having the end wall thereof in abutments with the end of the trunnion, a plurality of flat-ended rollers between the adacent peripheries of the bearing and trunnion, means for retaining said rollers by their inner ends against lateral displacement relative to said bearing, and a sheet metal retainer ring fixed on the open end of the bearing in spaced relation to the other ends of said rollers and having a flat inturned flange portion at right angles to the axes of said rollers, the inner marginal edge portion of which is bent to offset relation with respect to the rest of the flange but parallel thereto into abutment with the flat ends of the rollers, whereby to hold the outer ends of said rollers against outward movement forms lateral displacement from the bearing prior to assembly of the bearing on the trunnion.

2. A structure as set forth in claim 1 wherein the retainer ring is of readily conformable sheet metal, whereby to permit bending the same after it has been mounted on the bearing member so as to bring the flat portion thereof into the prescribed relation to the flat ends of the rollers.

3. In a universal joint having trunnions and bearings adapted to be lubricated, means for sealing each bearing against loss of lubricant, comprising a packing washer of compressible resilient material encircling the trunnion, a spring for urging the washer axially against a seat around the base of the trunnion to maintain an oil-tight joint, and a retainer ring for the washer mounted on the bearing, said retainer ring having a side wall within which the packing washer is adapted to be compressed, said wall having openings into or through which the packing washer is adapted to bulge, whereby to interlock with the ring and prevent turning relative thereto, the retainer ring being of stamped sheet metal arranged to have a press fit in a recess provided therefor on the bearing, and said ring having a peripheral flange the edge of which is scalloped to provide the openings for reception of the bulged portions of the packing material compressed in the ring.

4. In a universal joint having trunnions received in lubricated bearings, a packing for the joint between the bearing and the annular seat at the base of each trunnion comprising a packing washer of resilient compressible material encircling the trunnion and engaging the seat, a metallic washer resting on top of said packing washer, a spring acting between the bearing and the metallic washer for urging the packing washer against the seat, and a retainer wall turning with the bearing and surrounding the packing washer, the packing washer being adapted to be compressed within said wall, said wall having one or more openings into or through which the packing washer is adapted to bulge so as to interlock with the wall and prevent turning of the packing washer relative thereto and insure wiping contact of the packing washer with the seat.

5. A structure as set forth in claim 4 wherein the seat is outwardly inclined, whereby the packing washer is caused to expand toward the retaining wall under pressure of the spring acting against it.

6. In a universal joint having trunnions received in lubricated bearings, a packing for the joint between the bearing and the annular shoulder at the base of each trunnion comprising a washer of cork composition adapted to seat against said shoulder, a spring acting against the top of the washer to urge the same against the shoulder to maintain an oil-tight joint, and an enclosing ring to retain the washer and spring having the washer compressed radially therein and having the spring disposed between a portion of the ring and the top of the washer and bearing on the latter, the ring being of stamped sheet metal arranged to have a press fit in a recess provided therefor on the bearing, said ring having a peripheral flange, the edge of which is scalloped to provide openings into or through which the material of the washed is adapted to bulge and thus interlock the washer with the ring to prevent turning relative thereto.

7. In a universal joint having trunnions received in lubricated roller bearings, packing means for the joint between the bearing and the annular seat at the base of each trunnion comprising a packing washer of resilient compressible material encircling the trunnion and engaging the seat, a spring for urging the washer axially against the seat to maintain an oil tight joint, and a retainer ring for the washer mounted on the bearing and having a side wall within which the packing washer is adapted to be compressed, said wall being formed to interlock with the packing ring and prevent turning of said ring relative thereto, said retainer ring also having an inner end wall at right angles to the axes of the rollers and trunnion, the outer marginal portion of said wall forming an abutment for the aforesaid spring, and the inner marginal portion of said wall being bent to offset relation with respect to the outer portion but parallel thereto into abutment with the ends of the rollers for the purpose described.

CARL E. SWENSON.